United States Patent
Havens et al.

(10) Patent No.: US 12,164,297 B2
(45) Date of Patent: *Dec. 10, 2024

(54) SYSTEMS AND METHODS FOR DYNAMIC PREDICTIVE CONTROL OF AUTONOMOUS VEHICLES

(71) Applicant: TuSimple, Inc., San Diego, CA (US)

(72) Inventors: Aaron Havens, Ankey, IA (US); Jun Chen, San Diego, CA (US); Yujia Wu, Emeryville, CA (US); Haoming Sun, San Diego, CA (US); Zijie Xuan, Tuscon, AZ (US); Arda Kurt, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,466

(22) Filed: Sep. 18, 2023

(65) Prior Publication Data

US 2024/0004386 A1    Jan. 4, 2024

Related U.S. Application Data

(63) Continuation of application No. 17/805,219, filed on Jun. 2, 2022, now Pat. No. 11,809,185, which is a
(Continued)

(51) Int. Cl.
*G05D 1/00* (2024.01)
*G05B 19/4155* (2006.01)
(Continued)

(52) U.S. Cl.
CPC ....... *G05D 1/0088* (2013.01); *G05B 19/4155* (2013.01); *G05D 1/0212* (2013.01);
(Continued)

(58) Field of Classification Search
CPC ............... G05D 1/0088; G05D 1/0212; G05D 2201/0213; G05B 19/4155;
(Continued)

(56) References Cited

U.S. PATENT DOCUMENTS 11,372,403 B2 *  6/2022 Havens .................. G06F 17/11
11,809,185 B2 * 11/2023 Havens ................ G05D 1/0212
(Continued)

FOREIGN PATENT DOCUMENTS

CN        103085816 A       5/2013
CN        105717917 A       6/2016
(Continued)

OTHER PUBLICATIONS

Prasetyo, Hanif Fauzan, et al. "Implementation of Model Predictive Control (MPC) in electric vehicle testing simulator." *2017 4th International Conference on Electric Vehicular Technology (ICEVT)*. IEEE, 2017.

(Continued)

*Primary Examiner* — Hussein Elchanti
(74) *Attorney, Agent, or Firm* — Perkins Coie LLP (57)    ABSTRACT

Systems and methods for dynamic predictive control of autonomous vehicles are disclosed. In one aspect, an in-vehicle control system for a semi-truck includes one or more control mechanisms configured to control movement of the semi-truck and a processor. The system further includes computer-readable memory in communication with the processor and having stored thereon computer-executable instructions to cause the processor to receive a desired trajectory and a vehicle status of the semi-truck, determine a dynamic model of the semi-truck based on the desired trajectory and the vehicle status, determine at least one quadratic program (QP) problem based on the dynamic model, generate at least one control command for control- (Continued)

ling the semi-truck by solving the at least one QP problem, and provide the at least one control command to the one or more control mechanisms.

20 Claims, 5 Drawing Sheets

Related U.S. Application Data continuation of application No. 16/181,110, filed on Nov. 5, 2018, now Pat. No. 11,372,403.

(51) Int. Cl.
*G06F 17/11* (2006.01)
*B60W 10/18* (2012.01)
*B60W 10/20* (2006.01)
*B60W 50/00* (2006.01)

(52) U.S. Cl.
CPC ............ *G06F 17/11* (2013.01); *B60W 10/18* (2013.01); *B60W 10/20* (2013.01); *B60W 50/00* (2013.01); *B60W 2050/0011* (2013.01); *B60W 2050/0028* (2013.01); *B60W 2050/0083* (2013.01); *B60W 2300/145* (2013.01); *B60W 2400/00* (2013.01); *B60W 2520/22* (2013.01); *B60W 2530/10* (2013.01); *B60W 2710/18* (2013.01); *B60W 2710/20* (2013.01); *G05B 2219/42033* (2013.01)

(58) Field of Classification Search
CPC ......... G05B 2219/42033; G06F 17/11; B60W 10/18; B60W 10/20; B60W 50/00; B60W 2050/0011; B60W 2050/0028; B60W 2050/0083; B60W 2300/145; B60W 2400/00; B60W 2520/22; B60W 2530/10; B60W 2710/18; B60W 2710/20
See application file for complete search history.

(56) References Cited

U.S. PATENT DOCUMENTS

| | | | |
|---|---|---|---|
| 2006/0098725 A1 | 5/2006 | Rhee et al. | |
| 2008/0195280 A1 | 8/2008 | Deng et al. | |
| 2010/0299013 A1* | 11/2010 | Dolgov | G05D 1/0274 701/25 |
| 2015/0073663 A1 | 3/2015 | Nilsson et al. | |
| 2016/0091897 A1 | 3/2016 | Nilsson et al. | |
| 2016/0362135 A1 | 12/2016 | Xu et al. | |
| 2018/0059670 A1 | 3/2018 | Nilsson et al. | |
| 2018/0111621 A1* | 4/2018 | Buss | B60W 40/10 |
| 2018/0215358 A1 | 8/2018 | Hall et al. | |
| 2018/0244310 A1 | 8/2018 | Pursifull et al. | |
| 2018/0253102 A1 | 9/2018 | Appelt et al. | |
| 2018/0265076 A1 | 9/2018 | Hall et al. | |
| 2019/0056736 A1 | 2/2019 | Wood et al. | |
| 2019/0061817 A1* | 2/2019 | Mattern | B62D 6/002 |
| 2019/0155229 A1 | 5/2019 | Herrera | |
| 2019/0233034 A1 | 8/2019 | Viele et al. | |
| 2019/0235504 A1* | 8/2019 | Carter | G05D 1/0231 |
| 2019/0278284 A1 | 9/2019 | Zhang et al. | |
| 2020/0001920 A1 | 1/2020 | Hejase et al. | |
| 2020/0055357 A1 | 2/2020 | Laine | |

FOREIGN PATENT DOCUMENTS

| | | |
|---|---|---|
| CN | 106891888 A | 6/2017 |
| CN | 107491769 A | 12/2017 |
| CN | 107521496 A | 12/2017 |
| CN | 107561942 A | 1/2018 |
| CN | 107831763 A | 3/2018 |
| CN | 108445885 A | 8/2018 |
| EP | 2848487 A1 | 3/2015 |
| GB | 2568879 A | 6/2019 |
| WO | WO 2018/063250 | 4/2018 |

OTHER PUBLICATIONS

Search Report in Notice of Grant of Chinese patent application No. 2019110703612, dated Oct. 9, 2023.
Search Report received in Chinese Application No. 201911070361.2, dated Jun. 28, 2023.
First Office Action in Chinese Application No. 201911070361.2, dated Jun. 29, 2023.
Ji, Jie, et al. "Path planning and tracking for lane changing based on model predictive control." *China Journal of Highway and Transport* 31.4 (2018): 172-179.
Li Jinliang, Hao Liang & Cao Zhi. (2017). Driverless Vehicle Tracking Based on Model Predictive Control. Automotive Engineer 2017 (10), 33-35. http://oversea.cnki.net/kcms/detail.aspx?DBCode=CJFD&DBName=CJFDLAST2017&fileName=TJQC201710010.
Liu Cong-zhi, Wang Lingyan, Ma Luping & Ren Bingyu. (2017). Application of Yaw and Slip Combination Control to Vehicle Operation Stability. *Machinery Design & Manufacturing* 2017 (04), 68-72. http://www.cnki.net/KCMS/detail.aspx?dbcode=CJFD&dbname=CJFDLAST2017&filename=JSYZ201704018.
Wang Feng-yuan, Xu Qiaoni, He Shi & Zhong Jian. (2018). Research on Lateral Control Strategy of Intelligent Electric Vehicles. *Machinery Design & Manufacturing* 2018 (04), 224-227. http://www.cnki.net/KCMS/detail.aspx?dbcode=CJFD&dbname=DJFDLAST2018&filename=JSYZ201804065.
Xu, Yaoyin, et al. "Model predictive control for lane keeping system in autonomous vehicle." *2017 7th International Conference on Power Electronics Systems and Applications-Smart Mobility, Power Transfer & Security (PESA).* IEEE, 2017.
Yuan Lin. (2016). Yaw Stability Model Predictive Control of In-Wheel-Motor Electric Vehicle (Master's Dissertation, Harbin Institute of Technology). https://kns.cnki.net/KSMS/detail/detail.aspx?dbname=CMFD201701&filename=1016774481.nh.
Search Report received in Chinese Application No. 201911074498.5, dated Jul. 10, 2023.
Office Action received in Chinese Application No. 201911074498.5, dated Jul. 12, 2023.

* cited by examiner

SYSTEMS AND METHODS FOR DYNAMIC PREDICTIVE CONTROL OF AUTONOMOUS VEHICLES

CROSS-REFERENCE TO RELATED APPLICATION(S)

This application is a continuation of U.S. patent application Ser. No. 17/805,219, filed Jun. 2, 2022, which is a continuation of U.S. patent application Ser. No. 16/181,110, filed Nov. 5, 2018, the disclosure of which is incorporated herein by reference. Any and all applications for which a foreign or domestic priority claim is identified in the Application Data Sheet as filed with the present application are hereby incorporated by reference under 37 CFR 1.57.

TECHNOLOGICAL FIELD

The described technology generally relates to systems and methods for autonomous driving, and more particularly, to improved predictive control for autonomous driving.

DESCRIPTION OF THE RELATED TECHNOLOGY

In autonomous driving systems, the accurate perception and prediction of the surrounding driving environment and traffic participants are crucial for making correct and safe decisions for control of the autonomous or host vehicle. Additionally, the autonomous driving system must have accurate measurements of the current state of the vehicle being driven (also referred to as the ego vehicle), for example, of the speed, acceleration, road conditions, location of the vehicle within the current lane, etc. Accurate prediction of changes to the state of the vehicle in response to control commands such as steering, acceleration, and/or brake commands, can also be used as a parameter for autonomous vehicle control. Certain vehicles, such as a semi-truck having a tractor and trailer, may have a more complex state due to the additional degrees of freedom provided by a pivot point at which the trailer is attached to the tractor, leading to complexity in predicting future states of the vehicles.

SUMMARY OF CERTAIN INVENTIVE ASPECTS

One inventive aspect is an in-vehicle control system for a semi-truck, comprising: a processor; and a computer-readable memory in communication with the processor and having stored thereon computer-executable instructions to cause the processor to: receive a desired trajectory and a vehicle status of the semi-truck, update a dynamic model of the semi-truck based on the desired trajectory and the vehicle status, generate at least one control command for controlling the semi-truck based on the updated dynamic model and at least one quadratic program (QP) problem, output the at least one control command.

Another aspect is a semi-truck, comprising: the in-vehicle control system; and one or more control mechanisms configured to control movement of the semi-truck, wherein the memory further has stored thereon computer-executable instructions to cause the processor to output the at least one control command to the one or more control mechanisms.

Yet another aspect is a non-transitory computer readable storage medium having stored thereon instructions that, when executed, cause at least one computing device to: receive a desired trajectory and a vehicle status of a semi-truck, determine a dynamic model of the semi-truck based on the desired trajectory and the vehicle status, generate at least one control command for controlling the semi-truck by based on the dynamic model and at least one quadratic program (QP) problem, and output the at least one control command.

Still yet another aspect is a method for controlling movement of a semi-truck, comprising: receiving a desired trajectory and a vehicle status of a semi-truck, determining a dynamic model of the semi-truck based on the desired trajectory and the vehicle status, generating at least one control command for controlling the semi-truck based on the dynamic model and at least one quadratic program (QP) problem, and outputting the at least one control command.

DETAILED DESCRIPTION OF CERTAIN INVENTIVE EMBODIMENTS

Introduction to In-Vehicle Control Systems

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for dynamic predictive control of autonomous vehicles are described herein. An example embodiment disclosed herein can be used in the context of an in-vehicle control system 150 in a vehicle ecosystem 101. In one example embodiment, the in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described herein can be implemented, configured, and used in a variety of other applications and systems as well.

Figure 1:
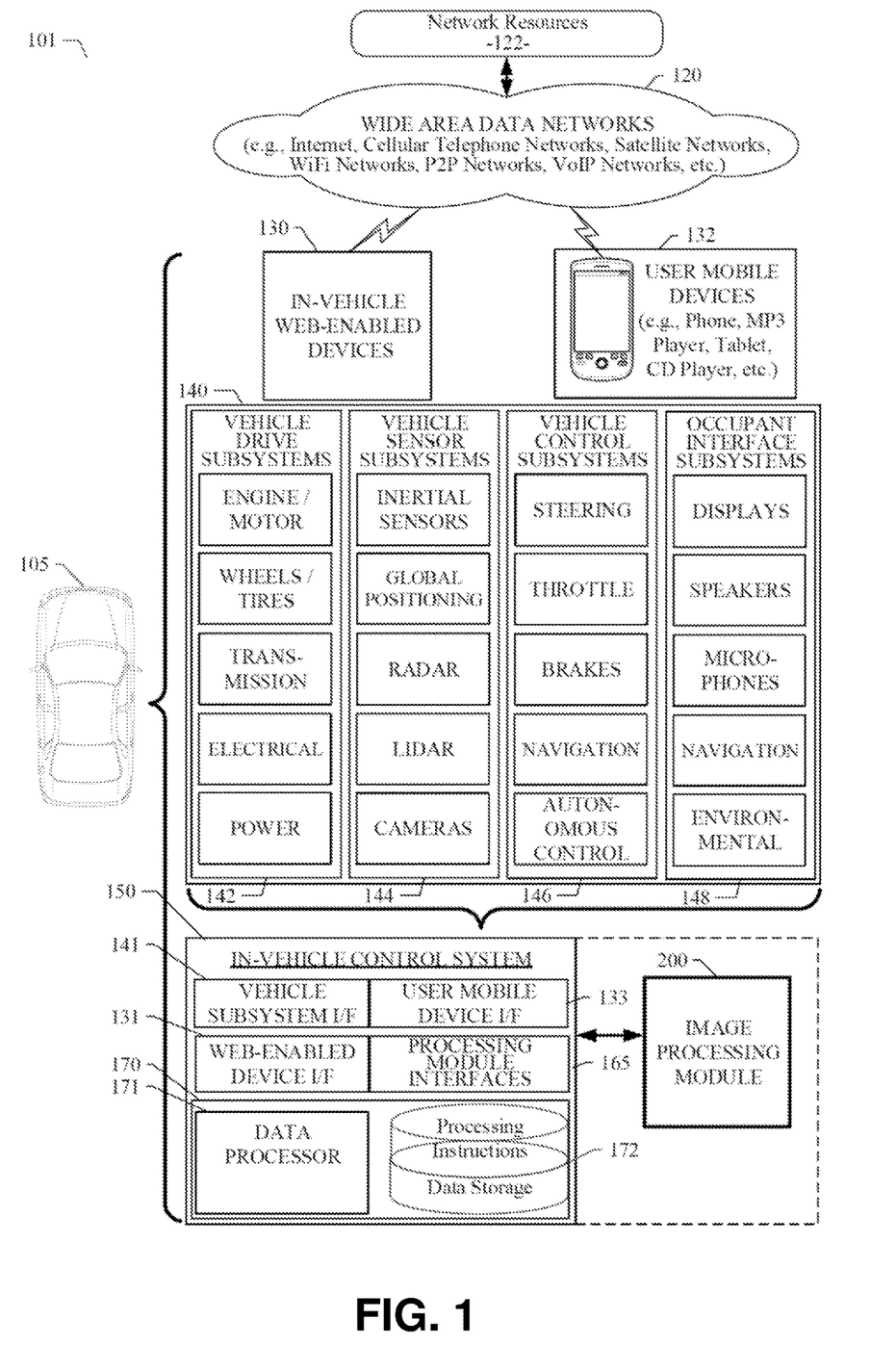
FIG. 1 is a block diagram illustrating an example ecosystem including an in-vehicle control system and an image processing module in accordance with aspects of this disclosure.

With continuing reference to FIG. 1, a block diagram illustrates an example ecosystem 101 in which the in-vehicle control system 150 and the image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can reside in the vehicle 105. A vehicle subsystem interface 141 is provided to facilitate data communication between the in-vehicle control system 150 and the plurality of vehicle subsystems 140. The in-vehicle control system 150 can include a data processor 171 configured to execute the image processing module 200 for processing image data received from one or more of the plurality of vehicle subsystems 140. The data processor 171 can be combined with a data storage device 172 as part of a computing system 170 in the in-vehicle control system 150. The data storage device 172 can be used to store data, processing parameters, and data processing instructions.

A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

Figure 2:
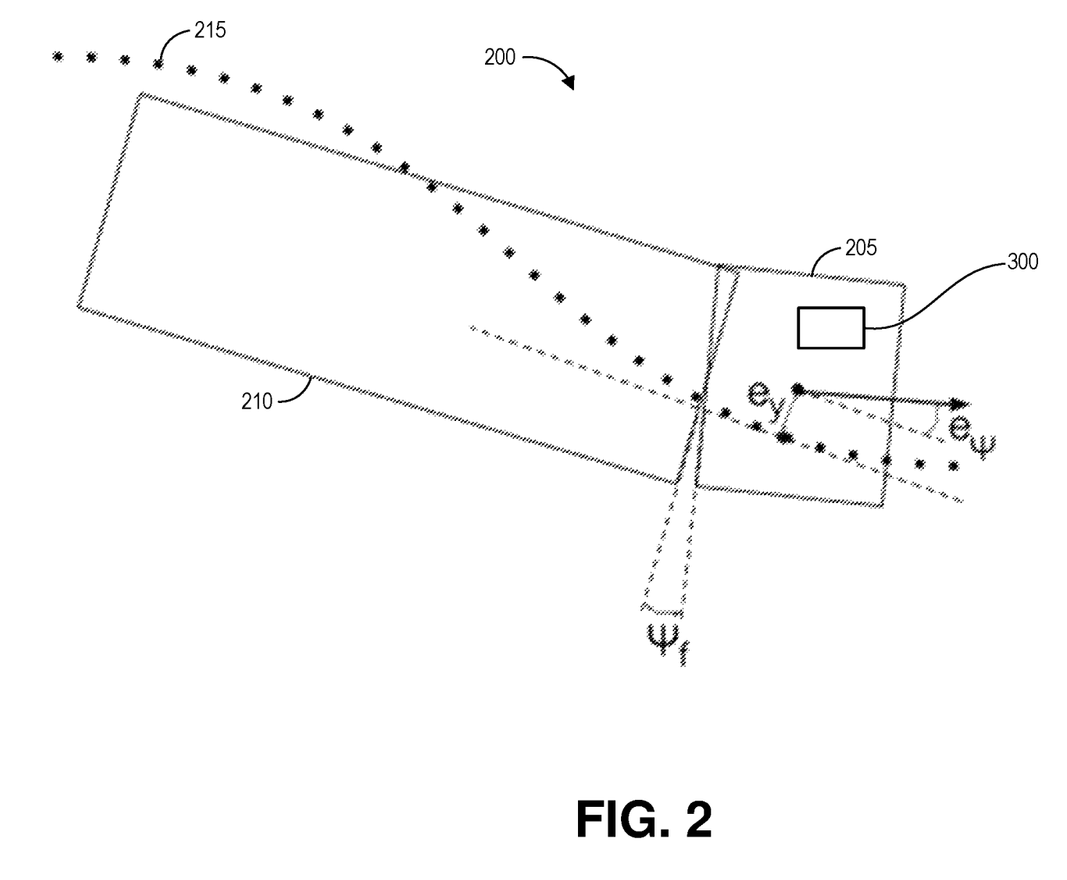
FIG. 2 is a simplified diagram of a semi-truck having a vehicle operational subsystem configured to generate a dynamic model of vehicle movement and a desired trajectory of the vehicle in accordance with aspects of this disclosure.
Figure 3:
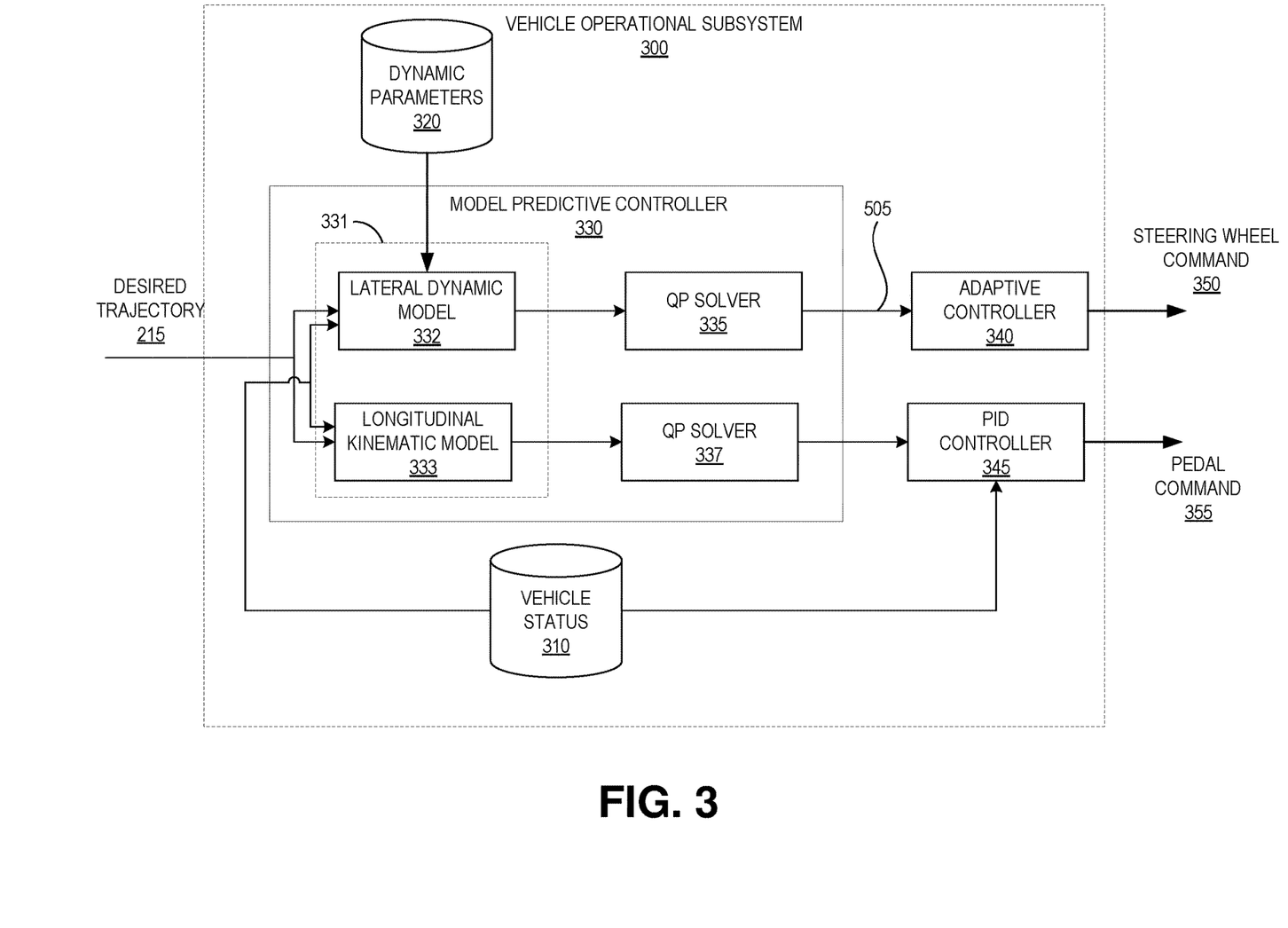
FIG. 3 illustrates an example block diagram of the vehicle operational subsystem for the autonomous control of the semi-truck illustrated in FIG. 2 in accordance with aspects of this disclosure.

Although not illustrated in FIG. 1, the in-vehicle control system 150 and/or the vehicle subsystems 140 may include a vehicle operational subsystem 300 (e.g., as shown in FIGS. 2 and 3) configured to generate a dynamic model of vehicle movement of the autonomous vehicle. Further details regarding the subsystem 300 are provided below.

The in-vehicle control system 150 can be configured to receive or transmit data to/from a network 120 and network resources 122 connected thereto. An in-vehicle web-enabled device 130 and/or a mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a mobile device interface 133 can be used by the in-vehicle control system 150 to facilitate data communication between the in-vehicle control system 150 and the network 120 via the mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include the network 120. The network 120 represents one or more traditional data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with the network resources 122, such as websites, servers, central control sites, or the like. The network resources 122 can generate and/or distribute data, which can be received in the vehicle 105 via the in-vehicle web-enabled devices 130 or the mobile devices 132. The network resources 122 can also host network cloud services, which can support the functionality used to compute or assist in processing image input or image input analysis. Antennas can serve to connect the in-vehicle control system 150 and the image processing module 200 with the network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The broadcast networks, such as AM/FM radio networks, pager networks, UHF networks, gaming networks, WiFi networks, peer-to-peer networks, Voice over IP (VoIP) networks, and the like are also available. Thus, the in-vehicle control system 150 and the image processing module 200 can receive web-based data or content via the web-enabled device interface 131, which can be used to connect with the in-vehicle web-enabled device 130 and the network 120. In this manner, the in-vehicle control system 150 and the image processing module 200 can support a variety of network-connectable in-vehicle devices and systems from within the vehicle 105.

As shown in FIG. 1, the in-vehicle control system 150 and the image processing module 200 can also receive data, image processing control parameters, and training content from the mobile devices 132, which can be located inside or proximately to the vehicle 105. The mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200.

As shown in FIG. 1, the mobile devices 132 can also be in data communication with the network 120. The mobile devices 132 can source data and content from internal memory components of the mobile devices 132 themselves or from the network resources 122 via the network 120. Additionally, the mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of the ecosystem 101 can include the plurality of vehicle subsystems 140. For embodiments that are implemented in the vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from one or more of the plurality of vehicle subsystems 140 (e.g., ECUs of the vehicle 105) to the in-vehicle control system 150 via the vehicle subsystem interface 141 may include information about the state of one or more of the components or subsystems of the vehicle 105. In particular, the data signals, which can be communicated from the vehicle subsystems 140 to a Controller Area Network (CAN) bus of the vehicle 105, can be received and processed by the in-vehicle control system 150 via the vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles. Thus, the term "vehicle" as used herein can include any such mechanized systems. Embodiments of the systems and methods described herein can also be used with any systems employing some form of network data communications. However, such network communications are not required.

Referring still to FIG. 1, the example embodiment of the ecosystem 101, and the vehicle subsystems 140 therein, can include a variety of vehicle subsystems in support of the operation of the vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 can be configured to operate fully or partially in an autonomous mode. For example, the vehicle 105 can control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and/or control the vehicle 105 based on the determined information. While in autonomous mode, the vehicle 105 may be configured to operate without human interaction.

The vehicle 105 may include one or more of the vehicle subsystems 140 such as a vehicle drive subsystem 142, a vehicle sensor subsystem 144, a vehicle control subsystem 146, and an occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of the vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The term wheel may generally refer to a structure comprising a rim configured to be fixedly attached to a tire, which is typically formed of rubber. Optionally, a wheel may include a hubcap attached to an outer surface of the rim or the tire may be exposed to the environment without the inclusion of a hubcap. As used herein, the detection and/or segmentation of a wheel within an image may include the detection of the entire wheel/tire combination, including the rubber tire and the central wheel, when visible.

The wheels of a given vehicle may represent at least one wheel that is fixedly coupled to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit can be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include a plurality of control mechanisms such as a steering unit, a throttle, a brake unit, a navigation unit, and an autonomous control unit.

The steering unit may represent any combination of mechanisms that may be operable to adjust the heading of the vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

The occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, capabilities for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide capabilities for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of the vehicle 105, e.g., the vehicle subsystems 140, the computing system 170, the data storage device 172, and the image processing module 200, as being integrated into the vehicle 105, one or more of these components could be mounted or associated separately from the vehicle 105. For example, the data storage device 172 could, in part or in full, exist separate from the vehicle 105. Thus, the vehicle 105 could be provided in the form of device elements that may be located separately or together. The device elements that make up the vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of the vehicle 105. In various example embodiments, the in-vehicle control system 150 and the image processing module 200 in data communication therewith can be implemented as integrated components or as separate components. For example, the image processing module 200 can be included as a set of instructions stored in a non-transitory computer readable medium, such as the data storage device 172, for causing the data processor 171 to perform various image processing functionality. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Predictive Control of Autonomous Vehicles

In the various example embodiments disclosed herein, a system and method for modeling the response of an autonomous vehicle to potential control commands (e.g., a steering wheel position command, acceleration and/or brake pedal control commands, etc.) to predict the vehicle's response to the control commands are provided. FIG. 2 is a simplified diagram of a semi-truck 200 having a vehicle operational subsystem 300 configured to generate a dynamic model of vehicle movement and a desired trajectory of the vehicle in accordance with aspects of this disclosure. As shown in FIG. 2, an embodiment of the vehicle 105 from FIG. 1 is a semi-truck 200. The semi-truck 200 can include a tractor 205 and a trailer 210, which may be connected at a pivot point, for example, via a fifth-wheel hitch. The semi-truck 200 can include an in-vehicle control system (e.g., the in-vehicle control system 150 of FIG. 1) configured to autonomously control driving of the semi-truck 200 based on a desired trajectory 215. Further, the tractor 205 may include vehicle subsystems 140 (not illustrated) and/or an in-vehicle control system 150 (not illustrated) including the vehicle operational subsystem 300. Although aspects of this disclosure are described in connection with a semi-truck 200 as an example vehicle which can be controlled using dynamic modelling, this disclosure can also be adapted for the autonomous control of other types of vehicles 105, including passenger vehicles, articulated buses, tractors 205 pulling multiple trailers 210, etc.

Control of the semi-truck 200 may include generating commands such as steering, throttle (e.g., acceleration), and/or brake commands in order to match the movement of the semi-truck 200 to the desired trajectory 215. In some embodiments, the determination of values for the control commands may involve modeling the physical response of the semi-truck 200 to potential commands in order to predict values for the commands which will result in the semi-truck 200 following the desired trajectory 215 with minimal error.

FIG. 2 also illustrates one technique for defining the various error(s) between the current state of the semi-truck 200 and the desired trajectory 215. In the illustrated example, the error(s) may include a heading error $e_\psi$ and a relative lateral position error $e_y$. As used herein, the combination of each of the errors between the current state of the semi-truck 200 and the desired trajectory 215 (e.g., the heading error $e_\psi$ and the relative lateral position error $e_y$) may be referred to as an error state. Also illustrated in FIG. 2 is a relative trailer angle $\psi_f$ that defines the angle formed between the tractor 205 and the trailer 210.

Aspects of this disclosure generally relate to systems and techniques for autonomously controlling a path-following semi-truck 200. In certain embodiments, the autonomous control is based on provided future reference points (e.g., the desired vehicle trajectory 215). For example, in certain embodiments, a steering wheel angle and a throttle command can be computed online (e.g., in substantial real-time) and executed by-wire.

The vehicle operational subsystem 300 may include a model predictive controller (MPC) 330 (as illustrated in FIG. 3). A model of the complex systems used to describe the motion of the semi-truck 200 in response to the input commands may include high dimension(s) and may be highly non-linear, which trade-off solving time and feasibility in the MPC 330. The dynamic needs of the semi-truck 200 are addressed in aspects of this disclosure, which in certain embodiments, may include approximating the dynamics of the semi-truck 200 by reducing and/or simplifying the high dimension and/or non-linear dynamic model to a 6-state linear system. The linear system may be efficiently solved as a constrained quadratic program (QP) as described in detail below.

In certain embodiments, the autonomous control (e.g., autonomous driving) of the semi-truck 200 may involve minimizing the errors between the current state of the semi-truck 200 and the desired trajectory 215 such that the movement of the semi-truck 200 matches the desired trajectory 215 as closely as practical. The ability of the semi-truck 200 to follow the desired trajectory 215 depends not only on the current state of the semi-truck 200, but also on the commands provided to drive the semi-truck 200 and the semi-truck's 200 response to the commands. Thus, in order to match the desired trajectory 215, one or more of the in-vehicle control system 150, the vehicle subsystems 140, and the vehicle operational subsystem 300 (hereinafter referred to simply as the vehicle operational subsystem 300, even though certain aspects may be performed by one of the system/subsystems 150 and 140) may predict how the semi-truck 200 will respond to potential future commands which can be provided to autonomously drive the semi-truck 200. The accuracy with which the vehicle operational subsystem 300 is able to predict the semi-truck's 200 response to the input commands therefore affects how accurately the vehicle operational subsystem 300 is able to control the movement of the semi-truck 200 to match the desired trajectory 215.

One technique for predicting the response of the semi-truck 200 to input commands may include modelling the semi-truck's 200 response to these commands using a kinematic model. For example, the kinematic model of the semi-truck 200 may take into account the current velocity and position of the semi-truck 200 as a whole and predict the future movement of the semi-truck 200 in response to the input commands provided to the vehicle drive subsystem 142. However, the kinematic model may not properly take into account certain properties of the semi-truck 200, such as the mass, moment of inertia, and trailer angle $\psi_f$, cornering stiffness, articulation between the tractor 205 and trailer 210, etc. Thus, the accuracy of the predictions provided by the kinematic model may be limited due to the fact that various physical parameters which may affect how the semi-truck 200 moves in response to the commands are not considered by the kinematic model.

Certain aspects of this disclosure relate to the use of a dynamic model which can be used to more accurately predict movement of the semi-truck 200 in response to input commands. In at least one embodiment, the dynamic model may be based on Lagrangian mechanics, which describes the semi-truck's 200 response to certain input forces (which in turn may be based on the commands and/or external forces such as the slope of the road, curvature of a corner, etc.). The dynamic model may represent the internal dynamics of the semi-truck 200, including the mass, moment of inertia, trailer angle $\psi_f$, and the cornering stiffness at each tire of the semi-truck 200. The dynamic model can more accurately capture the complex and varying forces experienced by the semi-truck 200. In some implementations, the dynamic model may be complex and non-linear. Thus, it may be difficult and/or computationally prohibitive, to determine the commands which enable the semi-truck 200 to follow the desired trajectory 215 (e.g., by minimizing the heading error $e_\psi$ and a relative lateral position error $e_y$ as illustrated in FIG. 2). Certain implementations may include one or more model predictive controllers (MPC) 330 (see FIG. 3) configured to determine the steering wheel command and acceleration commands that follow the desired trajectory 215. However, some MPCs may not be well suited to solving such non-linear sets of equations at speeds required for real-time autonomous control of the vehicle 105 (e.g., the semi-truck 200), and thus, may not be able to solve the dynamic model at a high enough speed to control the autonomous driving of the semi-truck 200 in real-time.

Therefore, in certain embodiments, the vehicle operational subsystem 300 (e.g., via the MPC 330) may derive a linear system model based on the full non-linear dynamic model by using small angle error assumptions. An example small angle error assumption includes the approximation that sin θ≈θ, for values of θ approaching 0 (e.g., "small angle" values). In certain implementations, a small angle may be defined as a value of θ of less than 1 rad, however, other thresholds defining a small angle can also be used. Those skilled in the art will realize that other small angle error assumptions can also be made to simplify certain mathematical expressions. By using such small angle expressions based on small angle approximation, the vehicle operational subsystem 300 can express the dynamic model as one or more plain constrained QP problem(s). Plain constrained QP problems can be efficiently solved (e.g., at a speed sufficient to enable real-time autonomous control of the semi-truck 200) with a specialized QP solver. The MPC 330 can be implemented to include one or more specialized QP solver(s) for solving the generated QP problems.

In some embodiments, the vehicle operational subsystem 300 can simplify the dynamic model into a linear system. For example, the vehicle operational subsystem 300 can transform a reference frame for the dynamic model from global inertial coordinate frame to reference frame coordinate centered on the current position of the semi-truck 200 on the road. The vehicle operational subsystem 300 can determine a road referenced error model (e.g. including the heading error $e_\psi$ and the relative lateral position error $e_y$ of FIG. 2) by comparing the difference between the truck-based dynamic model and the referenced road dynamic model. The referenced road dynamic model may describe the desired trajectory 215 for the truck to follow. Since, under ordinary circumstance, the semi-truck 200 may follow the desired trajectory 215 with relatively small error angle (e.g., for each of the heading error $e_\psi$ and the relative lateral position error $e_y$), the vehicle operational subsystem 300 can simplify the dynamic model in the referenced road dynamic model form by dropping the second or higher order error terms from the dynamic model. Using this technique, the vehicle operational subsystem 300 can construct a 6-state linear error dynamic model.

FIG. 3 illustrates an example block diagram of the vehicle operational subsystem 300 for the autonomous control of the semi-truck 200 illustrated in FIG. 2 in accordance with aspects of this disclosure. The vehicle operational subsystem 300 may receive the desired trajectory 215. In some embodiments, the desired trajectory 215 may be computed by a subsystem external to the vehicle operational subsystem 300 of FIG. 3. However, in other embodiments, the vehicle operational subsystem 300 may be configured to generate the desired trajectory 215. The desired trajectory 215 may define waypoints and a speed profile for the semi-truck 200 to follow.

An embodiment of the vehicle operational subsystem 300 includes a vehicle status 310 database, a semi-truck internal dynamics parameters database 320, the model predictive controller 330 (also referred to simply as MPC), an adaptive controller 340, and a proportional-integral-derivative (PID) controller 345. The vehicle operational subsystem 300 may be configured to generate an output steering wheel command 350 and an output pedal command 355. In some embodiments, the output steering wheel command 350 and the output pedal command 355 may be respectively provided to the steering wheel and acceleration and/or brake pedal(s) or actuator(s) controlling the steering position and acceleration/deceleration of the semi-truck 200.

Although the vehicle status 310 database and the semi-truck internal dynamics parameters database 320 are illustrated as being included within the vehicle operational subsystem 300, in other embodiments, the vehicle status 310 database and the semi-truck internal dynamics parameters database 320 may be located in another portion of the in-vehicle control system 150 and/or the vehicle subsystems 140.

The model predictive controller 330 can include a dynamic linear time-invariant model 331, and one or more QP solvers 335 and 337. The dynamic linear time-invariant model 331 may include a lateral dynamics model 332 and a longitudinal kinematic model 333. Each of the lateral dynamics model 332 and the longitudinal kinematic model 333 may be configured to receive the desired trajectory 215 and the vehicle status 310. The lateral dynamics model 332 may also be configured to receive internal dynamic parameters of the semi-truck 200, which may include one or more of the mass of the semi-truck 200, moment of inertia of the semi-truck 200, trailer angle $\psi_f$, cornering stiffness, articulation between the tractor 205 and trailer 210, etc. Together, the lateral dynamics model 332 and the longitudinal kinematic model 333 may define a non-linear dynamic model for the semi-truck 200 approximated using small angle error assumptions.

In certain embodiments, the desired trajectory 215 may be received by the MPC 330 from an external module. In one embodiment, the in-vehicle control system 150 includes a motion planning module configured to generate the desired trajectory 215. The desired trajectory 215 may define a position, heading, speed, and/or time in the local coordinate frame. The desired trajectory 215 may discretized at a fixed time interval, to define a plurality of waypoints for the semi-truck 200 to follow. In some embodiments, the local frame coordinate basis and origin may be aligned with the current position and orientation of the tractor's 205 center of mass.

In addition to the desired trajectory 215, in certain embodiments, the MPC 330 receives the vehicle status from the vehicle status database 310. In some embodiments, the vehicle status may include the position, velocity, yaw angle, and/or yaw angle rate. With reference to FIG. 1, in some embodiments, the vehicle sensor subsystems 144 include a GPS-inertial measurement unit (GPS-IMU) configured to generate at least a portion of the vehicle status data.

In certain embodiments, the MPC 330 can be configured to generate two QP problems using the lateral dynamics model 332 and the longitudinal kinematic model 333. In certain embodiments, the MPC 330 determines an initial error state of the semi-truck 200 with respect to the frame of reference of the road, which may form a first reference point. The MPC 330 may model the movement of the semi-truck 200 over a prediction horizon using the dynamic linear time-invariant model 331. In one embodiment, the prediction horizon may be about 3-4 seconds, however, the prediction horizon may be a shorter or longer length of time in other embodiments. In certain embodiments, the MPC 330 can predict the movement of the semi-truck 200 using the dynamic linear time-invariant model 331, the average reference trajectory velocity of the semi-truck 200, and the curvature at every waypoint (e.g., yaw rate and yaw acceleration) of the desired trajectory 215.

The MPC 330 may be configured to impose several input and state constraints on the QP problems generated by the dynamic linear time-invariant model 331. In some implementations, these constraints can have the effect of minimizing the state error and use of inputs, given the gradient and Hessian of the objective function (e.g., the QP problems). In solving the QP problems, the QP solver 335 may determine a steering wheel command 350 based on the lateral dynamic model 332 while the QP solver 337 may determine a pedal command 355 based on the longitudinal kinematic model 333. As used herein, the term "optimized" may refer to the manner in which the solving of a QP problem by the QP solvers 335 and 337 finds a maximum or a minimum value. In some embodiments, the steering wheel command 350 and the pedal command 355 may be optimized in the sense that these commands maximize or minimize the QP problems.

After the two QP solvers 335 and 337 solve their respective QP problems, the adaptive controller 340 and the PID controller 345 may respectively determine the output steering wheel command 350 and the output pedal command 355 to drive the semi-truck 200 to the desired set points. The vehicle operational subsystem 300 may iterate through the entire described process at a frequency that enables the autonomous control of the semi-truck 200. After every controller iteration, using the lateral dynamic model 332 and the longitudinal kinematic model 333, the MPC 330 may determine a new Hessian and gradient due to the change in velocity profile of the semi-truck 200 and the change in the trajectory references of the desired trajectory 215 with respect to the local coordinate frame. Due to the construction of the two QP problems, the entire process can be performed at much higher update rates than a similar kinematic-model-based MPC implementation. For example, update rates can reach the kilohertz level using certain of the described techniques.

Example Technique for Determining a Dynamic Model

One objective of this disclosure includes ensuring that autonomous control of the semi-truck 200 reduces the error state towards zero in a smooth fashion. Smooth reduction of the error can include preventing sudden or sharp changes in the commands, which may lead to more predictable and/or more comfortable movement of the semi-truck 200. Predictive movement of the semi-truck 200 may increase autonomous driving safety by allowing other drivers present on the same road to effectively predict the movement of the semi-truck 200. Accordingly, the vehicle operational subsystem 300 may be configured to smooth the steering wheel command 350 and/or the pedal command 355 using, for example, the adaptive controller 340 and/or the PID controller 345.

Figure 4:
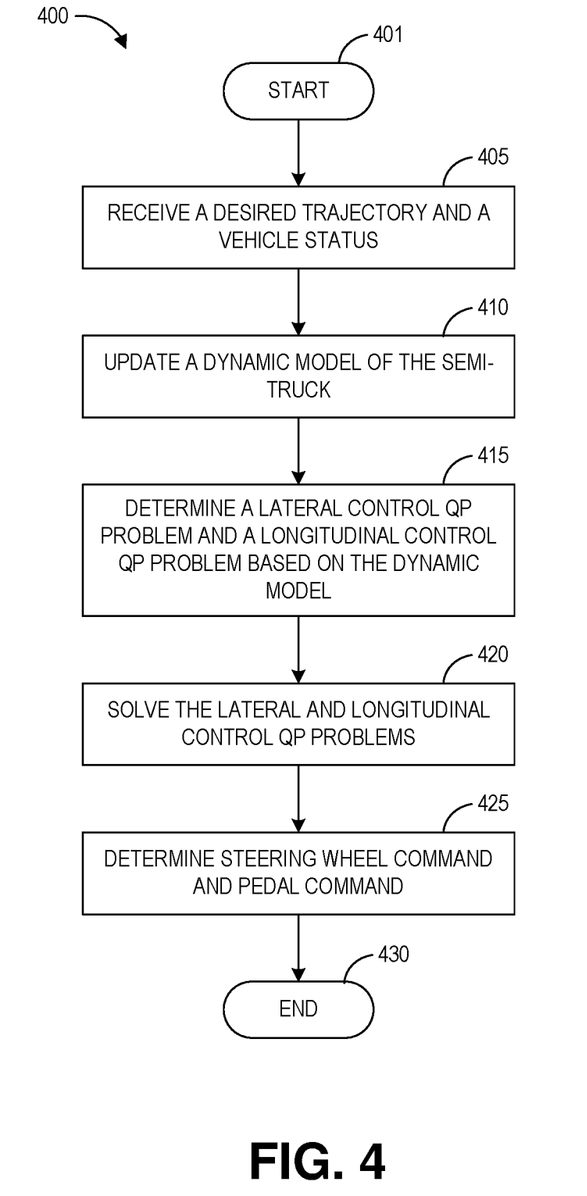
FIG. 4 illustrates an example method which can be used to autonomously control a vehicle using the vehicle operational subsystem illustrated in FIG. 3 in accordance with aspects of this disclosure.

FIG. 4 illustrates an example method which can be used to autonomously control the vehicle 105 using the vehicle operational subsystem 300 illustrated in FIG. 3 in accordance with aspects of this disclosure. The method 400 may be described herein as being performed by one or more processors, which may include a processor integrated in the vehicle operational subsystem (e.g., the MPC 330, the adaptive controller 340, and/or the PID controller 345), the data processor 171, and/or a processor included in the vehicle subsystems 140. For the sake of clarity, the set of one or more processors may be referred to simply as the singular "processor" herein.

The method 400 begins at block 401. At block 405, the processor receives the desired trajectory 215 and the vehicle status. In some embodiments, the desired trajectory 215 may be received from the motion planning module and the vehicle status may be received from the vehicle status database 310.

At block 410, the processor updates the dynamic linear time-invariant model 331 of the semi-truck 200 based on the desired trajectory 215 and the vehicle status. At block 415, the processor determines a lateral control QP problem and a longitudinal control QP problem based on the dynamic linear time-invariant model 331. For example, the processor may decouple the lateral and longitudinal control objectives of the dynamic linear time-invariant model 331 into two independent QP problems, including the lateral control QP problem based on the lateral dynamic model 332 and the longitudinal control QP problem based on the longitudinal kinematic model 333 which tracks the desired velocity of the semi-truck 200. In some embodiments, the processor may determine the QP problems based on one or more of the following criteria: i) to minimize the error state at every reference point, and ii) to penalize the use of command inputs and change in command input over time to encourage smooth and comfortable trajectories. Once the processor has determined QP problems for the prediction horizon in a quadratic matrix expression, the processor may determine the Hessian and gradient of the QP problems and provide the Hessian and gradient of the QP problems to the respective QP solvers 335 and 337.

At block 420, the processor solves the lateral and longitudinal controller QP problems. In some embodiments, the processor may employ a sequential QP algorithm called active set strategy to solve the two QP problems. Once the QP problems have been initialized and solved, the QP solvers 335 and 337 can use the previous solutions as a starting point to greatly decrease the convergence time of subsequent iterations of solving the QP problems.

At block 425, the processor determines the steering wheel command 350 and the pedal command 355 based on the solutions provided by the QP solvers 335 and 337. In some embodiments, the processor may employ the adaptive controller 340 and the PID controller 345 to smooth the optimal commands in determining the steering wheel command 350 and the pedal command 355. In certain implementations, the adaptive controller 340 and the PID controller 345 may smooth the commands over time (e.g., to reduce rates of change in the steering wheel command 350 and the pedal command 355, thereby reducing the likelihood there will be abrupt changes in the movement of the semi-truck 200). The method 400 ends at block 430.

There are a number of advantages associated with the described technology. For example, the dynamic model techniques disclosed herein may be able to precisely capture and utilize the detailed internal dynamic features of the semi-truck 200, such as mass, moment of inertia, trailer angle and the cornering stiffness of the tire model. By adjusting the associated parameters, embodiments of this disclosure may generate more accurate and reliable control commands. For example, different trailer 210 loads may result in different control commands due to the dynamic modelling of those trailer loads. Additionally, the use of a liner dynamic model enables the predictive control to be implemented as a specific optimization problem (e.g., a constrained QP problem) which can be efficiently solved with active QP set solver(s) 335 and 337. In certain implementations, the average solving speed can be increased to about 1000 HZ (1 ms), which can significantly enhance the dynamic model's online control ability. The dynamic model also serves model-referenced control techniques, such as the Model-Reference Adaptive Control, which can account for model uncertainties and disturbances.

Example Embodiment of the Adaptive Controller

Figure 5:
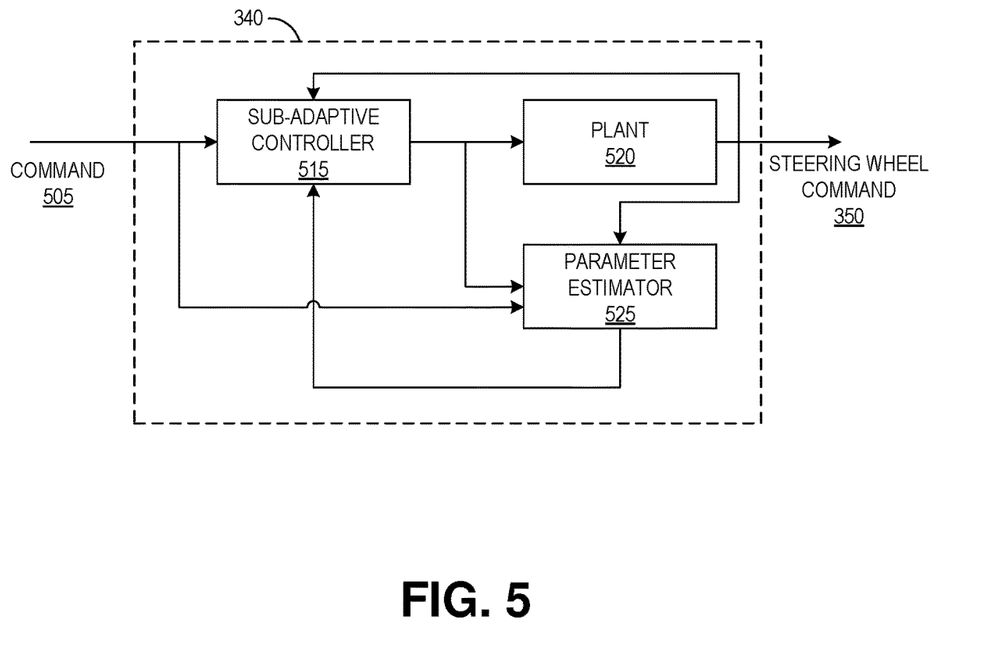
FIG. 5 illustrates an example block diagram of the adaptive controller for the vehicle operational subsystem illustrated in FIG. 3 in accordance with aspects of this disclosure.

FIG. 5 illustrates an example block diagram of the adaptive controller 340 for the vehicle operational subsystem 300 illustrated in FIG. 3 in accordance with aspects of this disclosure. As used herein, adaptive control may refer to a method to handle modeling uncertainties and slow time-varying disturbances. As shown in FIG. 5, the adaptive controller 340 is configured to receive the command 505 from the QP solver 335 and output the steering wheel command 350. In certain embodiments, the adaptive controller 340 includes a sub-adaptive controller 515, a plant 520, and a parameter estimator 525.

The parameter estimator 525 is configured to estimate values of parameters at each constant, according to a control law that is based on a known parameter case. The sub-adaptive controller 515 is configured to have multiple time-varying control gains. In certain embodiments, each of these gains is driven by "adaptation laws" that are based on measured tracking error signals and their derivatives. Through these adaptive gains, the sub-adaptive controller 515 can compensate for uncertainties in the system model and a certain class of disturbances that would normally degrade the control performance of the semi-truck 200. As the sub-adaptive controller 515 is applied to the steering control subsystem of the overall controller module, the improved performance due the adaptation improves lane-keeping and line-following accuracy with decreased lateral position error.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. An in-vehicle control system for a semi-truck, comprising:
    a processor; and
    a computer-readable memory in communication with the processor and having stored thereon computer-executable instructions to cause the processor to at least:
        receive a desired trajectory for autonomously driving the semi-truck and a vehicle status of the semi-truck,
        determine a lateral dynamic model and a longitudinal kinematic model of the semi-truck based on the desired trajectory and the vehicle status,
        model movement of the semi-truck over a prediction time horizon using the lateral dynamic model and the longitudinal kinematic model, generate at least one control command for controlling a movement of the semi-truck based on the modelled movement, and output the at least one control command for the autonomous driving of the semi-truck along the desired trajectory.

2. The system of claim 1, wherein the memory further has stored thereon computer-executable instructions to cause the processor to:

update a dynamic non-linear model of the semi-truck based on the desired trajectory and the vehicle status, wherein determining the lateral dynamic model and the longitudinal kinematic model is further based on an approximation of the dynamic non-linear model.

3. The system of claim 2, wherein updating the dynamic non-linear model is based on small angle error assumptions.

4. The system of claim 2, wherein the dynamic non-linear model is configured to predict the movement of the semi-truck in response to a potential control command during autonomous driving of the semi-truck.

5. The system of claim 2, wherein determining the lateral dynamic model and the longitudinal kinematic model includes transforming a reference frame for the dynamic non-linear model from a global inertial coordinate frame to a reference frame coordinate centered on a current position of the semi-truck on a road.

6. The system of claim 1, wherein modelling movement of the semi-truck comprises:

determining a first quadratic program problem based on the lateral dynamic model, and determining a second quadratic program problem based on the longitudinal kinematic model.

7. The system of claim 6, wherein the memory further has stored thereon computer-executable instructions to cause the processor to:

solving the first quadratic program problem to generate a first solution, and solving the second quadratic program problem to generate a second solution, wherein generating at least one control command is further based on the first solution and the second solution.

8. The system of claim 5, wherein the memory further has stored thereon computer-executable instructions to cause the processor to:

determine a road referenced error model based at least in part on a comparison between the transformed dynamic non-linear model and the desired trajectory.

9. The system of claim 8, wherein the road referenced error model comprises a heading error and a relative lateral position error.

10. The system of claim 1, wherein the modelling of the movement of the semi-truck comprises:

predicting the movement of the semi-truck using the lateral dynamic model and the longitudinal kinematic model, an average reference trajectory velocity of the semi-truck, and a curvature at a waypoint of the desired trajectory.

11. The system of claim 1, wherein:

determining the lateral dynamics model is further based at least in part on one or more internal dynamic parameters of the semi-truck.

12. The system of claim 11, wherein the one or more internal dynamic parameters include one or more of the following: a mass of the semi-truck, a moment of inertia of the semi-truck, a trailer angle, a cornering stiffness, and an articulation between a tractor and a trailer of the semi-truck.

13. A non-transitory computer readable storage medium having stored thereon instructions that, when executed, cause at least one computing device to at least:

receive a desired trajectory for autonomously driving a semi-truck and a vehicle status of the semi-truck;

determine a lateral dynamic model and a longitudinal kinematic model of the semi-truck based on the desired trajectory and the vehicle status;

model movement of the semi-truck over a prediction time horizon using the lateral dynamic model and the longitudinal kinematic model;

generate at least one control command for controlling a movement of the semi-truck based on the modelled movement; and output the at least one control command for the autonomous driving of the semi-truck along the desired trajectory.

14. The non-transitory computer readable storage medium of claim 13, wherein:

the modelling of the movement of the semi-truck comprises determining a first quadratic program problem based on the lateral dynamic model and a second quadratic program problem based on the longitudinal kinematic model, and the generating of the at least one control command comprises solving the first and second quadratic program problems.

15. The non-transitory computer readable storage medium of claim 14, wherein the first and second quadratic program problems decouple lateral and longitudinal control objectives of a dynamic linear time-invariant model.

16. The non-transitory computer readable storage medium of claim 14, wherein determining the first quadratic program problem and the second quadratic program problem is based on minimizing an error state at every reference point.

17. The non-transitory computer readable storage medium of claim 14, wherein determining the first quadratic program problem and the second quadratic program problem is based on penalizing using command inputs and change in the command inputs over time.

18. A method for controlling movement of a semi-truck, comprising:

receiving a desired trajectory for autonomously driving a semi-truck and a vehicle status of the semi-truck;

determining a lateral dynamic model and a longitudinal kinematic model of the semi-truck based on the desired trajectory and the vehicle status;

modelling movement of the semi-truck over a prediction time horizon using the lateral dynamic model and the longitudinal kinematic model;

generating at least one control command for controlling a movement of the semi-truck based on the modelled movement; and outputting the at least one control command for the autonomous driving of the semi-truck along the desired trajectory.

19. The method of claim 18, wherein the desired trajectory defines at least one of a position, heading, speed, and time in a local coordinate frame of the semi-truck.

20. The method of claim 18, wherein the desired trajectory is discretized at a time interval to define a plurality of waypoints and a speed profile for the semi-truck.

* * * * *